Sept. 1, 1953   R. E. PFLAUMER   2,650,619
PIPE PROTECTOR
Filed July 13, 1949
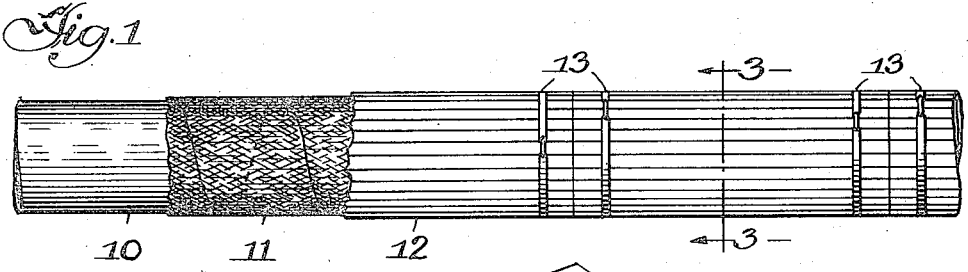
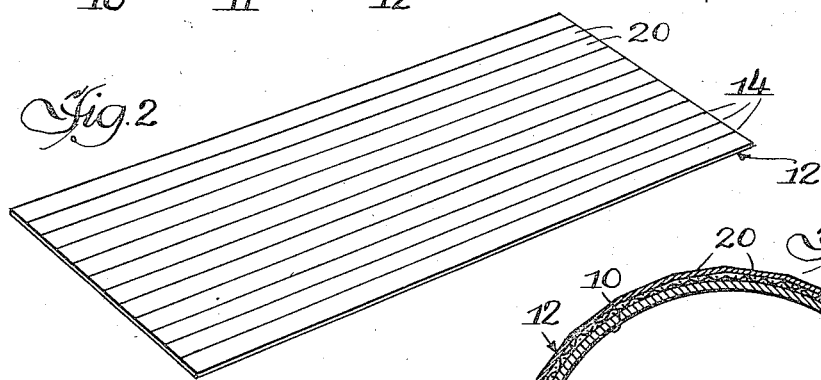
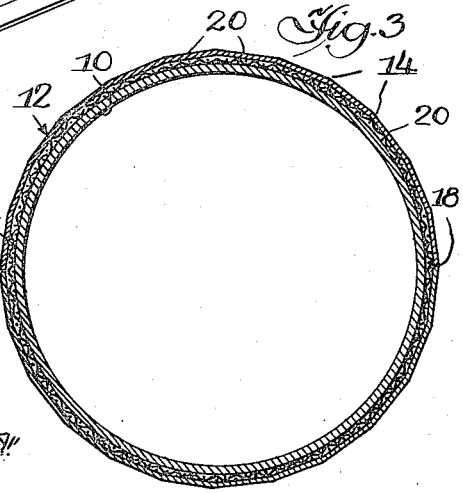
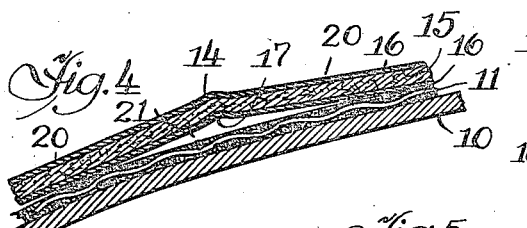
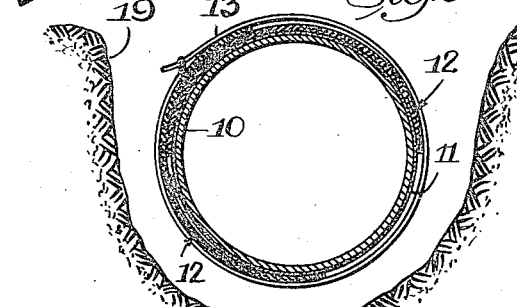
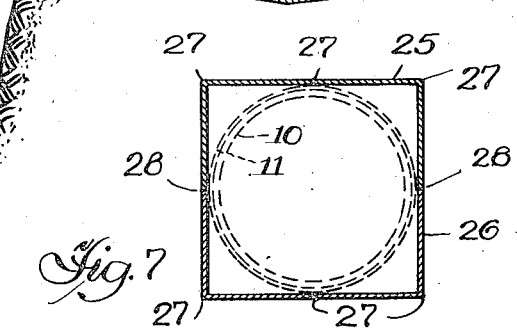
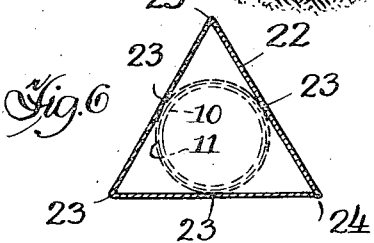
Inventor,
Robert E. Pflaumer
By Schneider & Dressler
Attys.

Patented Sept. 1, 1953

2,650,619

UNITED STATES PATENT OFFICE 2,650,619

PIPE PROTECTOR

Robert E. Pflaumer, Winnetka, Ill., assignor to American-Marietta Company, a corporation of Illinois Application July 13, 1949, Serial No. 104,460

4 Claims. (Cl. 138—64)

This invention relates to an armor sheet and to the use of that sheet in protecting oil and gas pipes, particularly pipes laid in rocky terrain.

As is known, oil and gas are now commonly "transported" from place to place as by pumping the same through pipes of circular section having diameters usually varying from about 10 inches to 36 inches. These pipes are protected from water and other corrosive forces prior to burial in the ground by covering the pipes with a thin, flexible waterproof material or membrane. The membrane usually used consists of a flexible sheet or matrix of burlap, cloth woven from glass fibers (sold under the trade-mark "Fiberglas"), and like materials capable of being impregnated with the saturant, pitch, asphalt, coal tar residues and like water-impervious materials, used to saturate, coat and bond the matrix to the pipe. The membrane is usually applied to the pipe in the form of a tight wrapping, preferably a continuous wrapping, and the covered pipe is then lowered into a ditch and covered with earth.

During the lowering of the covered pipe into the ditch and the covering thereof with earth the membrane is exposed to conditions and forces which make breaks therein and thus provide exposed portions "holidays" of pipe which are subject to corrosive attack, leading eventually to leaks and pipe failure. This is a serious problem in rocky country, for not only is the membrane subject to damage from the slings and other supporting members before and during the lowering of the coated pipe into position in the ditch, but to damage from falling rocks during the backfilling operation, from rocks and coarse sub-soil which are present in bottom of the ditch and on which the weight of the pipe may be supported, and from rocks, small stones and coarse sand whose sharp projections may be forced against the pipe by the weight of the backfill material. The stress caused by volume change of the subsoil immediately surrounding the pipe during periods of changing moisture content of this subsoil is a further and not infrequent source of "holidays" in all terrains where pipe is laid, rocky or otherwise.

In consequence of the large economic losses resulting from "holidays," great care is exercised in supporting the wrapped pipe and in lowering the same into the ditch. Additionally, in accordance with conventional prior art practice, the wrapped pipe is protected by a dirt padding. Thus the bottom of the ditch is covered with a layer of padding of graded dirt or sand approximately four inches in thickness and the membrane-covered pipe is lowered onto this padding. A padding of similar material and thickness is then applied to the top of the covered pipe and only then is the ditch backfilled with the coarser material removed from the earth in making the ditch. It is manifest that this padding procedure is an expensive one, particularly in mountainous areas where large volumes of clean earth suitable for the padding must be brought to the site.

Apart from the economic standpoint, this prior art method of protecting membrane-covered pipes laid in a ditch is objectionable because it is not possible to apply a padding of dirt of uniform composition and thickness about the pipe. In consequence, the covering about the pipe is subjected to varying forces throughout its length, with the result that "holidays" sometimes occur from this source.

In accordance with the present invention I place about the membrane-covered pipe before it is lowered into the ditch, a shield or armor of a material which not only protects the covered pipe from the slings but from falling rock and the other hazards heretofore encountered in laying the covered pipe in the ditch. In consequence of this method of protecting the membrane-covered pipe the protection is substantially uniform throughout the length of the pipe and the need for padding about the pipe is eliminated. The advantage flowing from the elimination of padding is a great one, for with it there is eliminated also the need for dump trucks, loading devices and the large number of laborers required for the application of the padding.

The armor material of the present invention is a rigid, self-sustaining sheet capable of withstanding impact, such as that from falling rock, and highly resistant to moisture. At spaced intervals throughout one dimension of the armor sheet flexible joints or hinges are provided so that the sheet may be made to conform generally to the circular contour of the membrane-covered pipe. In the preferred form of the present invention the sheet is made to conform as closely as possible to the contour of the membrane-covered pipe. One or more of such sheets may be required to completely or substantially completely encircle the membrane-covered pipe and when the pipe is so encircled, the armor is in the form of a polygon the sides of which have substantially only a line contact or a limited region of contact with the covered pipe. These sides extend tangentially of the pipe and are joined at the hinges, thus forming the angles of the polygon. Beneath each of these angles and extending substantially throughout the distance between the lines of contact of an adjacent pair of sides is a space which provides room for the relatively rigid over-lying armor to "give" under impact and thus reduce and in many instances actually eliminate the force of falling rocks which, if not for the armor, would make breaks in the membrane coating. Most of the covered pipe is protected by such spaced overlying structures and hence there is very little of the membrane-coated pipe which normally has direct contact with the armor and what little there is is spaced. In consequence there is very little of the falling rock which will strike the armor at the spaced regions of its contact with the pipe and have the force of impact thereof transmitted directly to the membrane, diminished only by the cushioning effect of the armour. Hence, the armor of the present invention substantially completely protects the membrane from the hazards of falling rock and from like hazards, as well as from the forces transmitted to the membrane by the sling used in lowering the protected pipe into the ditch.

The invention will be readily understood from the following detailed description of the illustrative embodiments shown in the accompanying drawings, in which:

Figure 1 is a fragmentary side elevation of a pipe which is armored and protected in accordance with the present invention, portions of the pipe covering being progressively broken away;

Fig. 2 is a perspective view of one of the preferred armor units or sheets of the present invention;

Fig. 3 is a transverse section taken along the line 3—3 of Fig. 1;

Fig. 4 is an enlarged view of a fragment of Fig. 3, showing more clearly the relationship of the armor to the pipe;

Fig. 5 is a transverse section of the pipe and a ditch in which the pipe is to be laid and covered with backfill, illustrating a method that may be employed to encase the pipe with the armor sheet of the present invention;

Fig. 6 is a view similar to Fig. 3 of a modified form of the invention; and

Fig. 7 is a view similar to Fig. 3 of a further modified form of the invention.

The preferred armor sheet or shield of the present invention is shown in Fig. 2. Fig. 5 illustrates a method which may be employed to encase the pipe with the armor sheets. Fig. 1 shows the preferred armor sheets encasing the membrane-covered pipe and Figs. 3 and 4 show how closely the armor sheets conform to the contour of the pipe, and illustrate a main advantage flowing from the use of the armor sheet of the present invention.

Referring to Figs. 1 to 5, there is shown a pipe 10 of circular cross section in which oil or gas may be pumped. Surrounding the pipe is a water-impermeable membrane 11 which serves to protect the pipe from corrosion during burial. This water-impermeable membrane is of conventional construction and is shown as being wrapped around the pipe, much like a bandage. It may be wrapped around the pipe in any desired manner, but the bandage wrapping is that commonly employed in the application of the water-impermeable membrane to the pipe.

In brief, the water-impermeable membrane consists of a flexible sheet or matrix of burlap or other woven material which is saturated and coated with pitch, asphalt, coal tar residue or like water-impervious materials. These same water-impervious materials are relied on to bond the impregnated fabric to the pipe. A sheet commonly used as the matrix for the water-impermeable membrane is cloth woven from glass fibers which is sold under the trade-mark "Fiberglas." The water-impermeable membrane, both in construction and manner of use, is conventional and hence will not be described in any further detail.

Encasing the membrane-protected pipe are the armor sheets 12 of the present invention. These are shown as being held about the membrane-covered pipe by straps or bands 13. They may be otherwise held about the membrane-covered pipe, if desired.

The armor sheets may have any shape and size, but usually they are rectangularly shaped, about four feet by eight feet, and about three-sixteenths of an inch in thickness. The armor sheet is a rigid, self-sustaining sheet and is provided with so-called hinges or flexible joints 14 running lengthwise of the sheet, which permits the sheet to be bent in at least one direction, so that it may be made to conform to the contour of the pipe to be protected thereby. These so-called hinges or flexible joints do not interfere with the normal handling or shipping of the armor sheet as a flat sheet.

The preferred armor sheet of the present invention consists of a mastic core 15 having liner or facing sheets 16 adhered to the opposite sides thereof. The mastic core consists of a homogeneous mixture of roofing scrap and asphalt in the approximate proportions, by weight, of two-thirds roofing scrap and one-third added asphalt. The added asphalt is, preferably, a high melt point asphalt. A preferred high melt point asphalt is one having a melting point of 195° F. and an A. S. T. M. penetration test of 0 to 3. One such asphalt is sold under the trade-mark "Stanolite."

The roofing scrap used in making up the mastic is that obtained from standard roofing material consisting of an asphalt-impregnated felt base which is coated on the top side with slate aggregate and mineral filler and on the bottom side with a dusting of mica or talc to prevent adjacent sheets from sticking together. These roofing materials are usually prepared by impregnating felt or other suitable fibrous material with a relatively low melting point asphalt, suitably an air blown, steam-refined asphalt having a melting point in the range of about 150 to 160° F. and an A. S. T. M. penetration of about 38 to 42. The asphalt-impregnated felt is then covered with a mineral-filled coating of asphalt which usually consists of crushed limestone or ground slag or slate aggregate and air blown, steam-refined asphalt having a melting point in the range of about 215 to 220° F. and an A. S. T. M. penetration of from about 18 to 20, in the approximate proportions of 45% by weight of mineral filler to 55% by weight of asphalt. The slate aggregate is applied to the top of the mineral-filled asphalt coating, and the back of the asphalt-impregnated felt sheet is coated with a dusting of mica or talc.

Standard roofing material of the character referred to above is usually sold in units of 108 square feet and each such unit consists of 11 lbs. of felt, 20 lbs. of asphalt saturant, 30 lbs. of the mineral-filled asphalt coating, 32 lbs of slate aggregate and 1 lb. of dusting powder.

Each of the liner or facing sheets 16 which is adhered to the opposite sides of the mastic core consists of heavy kraft paper saturated with asphalt, suitably a low melting point asphalt, for example, a pressure tar asphalt having a melting point of 140° F. and an A. S. T. M. penetration of 10 to 12. The proportions of liner stock to saturant, on a weight basis, may vary rather widely, say from equal parts by weight to from 35% by weight of saturant to 65% by weight of liner stock. A preferred composition of saturant-impregnated liner consists of approximately 57% by weight of liner to 43% by weight of saturant.

Any suitable paper or fibrous material capable of being saturated with asphalt may be used for the liner, but I prefer to use kraft paper having a thickness of 0.020 inch and a weight of 50 lbs. per 1000 square feet.

The composition of the preferred armor sheet described above is as follows:

| | Per cent by weight |
|---|---|
| Liners (0.020"–50#/MSF Kraft) | 7.9 |
| Liner saturant | 5.9 |
| Mineral matter | 26.6 |
| Fibers | 7.5 |
| Mastic core asphalt | 52.1 |
| | 100.0 |

The overall thickness of the mastic core and the facing sheets may vary rather widely say, for example, from about one-eighth inch to three-eighths inch. A preferred thickness is three-sixteenths of an inch.

The armor sheet is a rigid, self-sustaining, water-impermeable sheet having a very substantial structural strength, comparable to a plaster wallboard, and having great resistance to impact. The sheet is flexible and has some elasticity and hence when struck by a falling object, such as a stone, it "gives" under the impact of the stone and tends to return towards its original position. Under conditions of temperature at or above the melting temperature of the asphalt materials used in making the armor sheet, it may be shaped or molded. Under conditions normally encountered in storage, transportation and use, it maintains its rigid, self-sustaining form.

When the armor sheet is made up and cut to the desired size it is run through a set of grooving or creasing rollers which press against one side of the sheet at spaced intervals, as at 17, to form the fold lines or so-called hinges or flexible joints 14 which enable the sheet to be bent, preferably in one direction, but do not interfere with the normal handling and shipping of the product as a flat sheet. Other forms of hinges or flexible joints may, of course, be used. The spacing between the grooving or hinge-forming rollers may be varied, as desired, but it is preferred that they be spaced fairly close together, as indicated in the drawings, so that the armor sheet may be made to conform as closely as possible to the contour of the pipe which it is to embrace, as shown in Fig. 3. The number of so-called hinges in a sheet depends, of course, upon the size of the sheet and the size of the pipe to be embraced thereby.

As shown in Fig. 3, the pipe is encircled by two armor sheets the butting edges of which, indicated by the numeral 18, are preferably on opposite extremities of the horizontal diameter of the pipe, so as to be out of the line of direct travel of any stones falling on the pipe as it is being lowered into the ditch, indicated by the numeral 19. The armor sheets encircling the pipe are in the form of a polygon the sides 20 of which have only a very limited region of contact with the membrane-covered pipe. Each side 20 extends tangentially of the pipe and each adjacent pair of sides on each armor sheet is joined at the crease line 17 which, in effect, constitutes an angle of the polygon. Beneath each angle of the polygon is a space 21 within which the armor sheet may "give" under impact and from which it tends to spring back towards its original position after impact. The portion of each side 20 extending outwardly from the region of contact of the side with the membrane-protected pipe acts like a spring. For best results, it is preferred that these spring-like, projecting portions be of substantially equal length and that there be more than four sides in the polygonal armor about the membrane-covered pipe.

Tests were conducted on membrane-covered pipe protected with the armor sheet illustrated in Figs. 1 to 4. These tests consisted of dropping rocks of various sizes from a height of five feet directly on the armor about the membrane-covered pipe. In one test the rock was 11.5" x 9.5" x 3" in size and it struck the armor with its flat surface. In another test the rock size was 17" x 8" x 4" and it struck the armor with one of its sharp cutting edges. In still another test the rock size was 6" x 12" x 2.5" and it also struck the armor with a sharp cutting edge. The first rock only slightly marred the armor but left no mark on the membrane beneath it. The second rock actually penetrated substantially through the armor but did not injure the membrane. The third rock also substantially penetrated through the armor and it made but a slight mark on the membrane. Further tests were made by means of an electronic detector, in accordance with conventional procedures, to determine if there were "holidays" in the membrane and these tests indicated that there were none even in those portions of the membrane immediately beneath the areas where the rocks struck the armor. The atmospheric temperature at the times of each of the tests referred to above was 80° F.

A preferred way of encircling the membrane-protected pipe with the armor sheet illustrated in Fig. 2 is as follows. A pair of such sheets are superposed on each other on top of the pipe, with the crease lines 17 down, and these superposed sheets are bent along the crease lines to roughly conform with the pipe. At suitable intervals, usually four to five feet in the case of 4' x 8' armor sheets, strapping of fiber or steel, such as strapping 13, is loosely put in place around the circumference of the assembly of the two armor sheets and the membrane-protected pipe. The top armor sheet is then turned in the strapping to cover the bottom part of the pipe. The strapping acts as a sling to hold the armor sheets in place and when they are properly positioned the strapping can then be tightened to the desired tension. As pointed out above, it is preferred that the edges of the sheet form butt joints on opposite diameters of the horizontal diameter of the pipe; however, the edges of the two sheets may overlap or they may be left slightly spaced apart, thus leaving small gaps on the circumference.

The armor sheets are applied to the membrane-protected pipe as the latter is supported at some suitable position above the bottom of ditch 19. When the armor sheets are put in place and the strapping is secured, the supports are removed and the armored pipe is lowered to the bottom of the ditch and then the ditch is filled with backfill.

In the modification shown in Fig. 6 the membrane-protected pipe is shown armored with a single sheet 22 of the armor material described above. This sheet is shown as having five crease lines or hinge portions 23, to facilitate encirclement of the membrane-protected pipe with the armor sheet. These are double acting hinges, permitting bending of the sheet in either direction. The armor sheet, in section, is in the form of a triangle each side of which has only a limited region of contact with the membrane-protected pipe. The ends of the armor sheet are in butting relationship, as indicated at 24.

In the embodiment of the invention shown in Fig. 7, the membrane-protected pipe is shown as being encircled by two armor sheets 25 and 26 the cross sectional shape of which is that of a square. These armor sheets contact the membrane-protected pipe at only four limited regions, at the opposite extremities of the vertical and horizontal diameters of the pipe. Each of the sheets 25 and 26 is provided with three groove lines or hinges 27, similar to hinges 23, to facilitate encirclement of the pipe with the sheets. As shown, the ends of sheets 25 and 26 form butt joints, as at 28, although they may overlap or be spaced slightly apart, as indicated above.

The armor sheets of the present invention may be used to armor membrane-protected pipes designed for "transporting" oil and gas, regardless of the place of use of the pipes, be it in a ditch or at river crossings. Also, the armor sheets may be used to protect membrane-protected pipe sections, especially long ones which are pulled across swamps, or are pulled through casing at road crossings.

Although I have described a preferred embodiment of my armor sheet and some applications of that sheet to membrane-protected pipes in considerable detail, it will be understood that the description is intended to be illustrative as many details may be modified or changed without departing from the spirit or scope of my invention. Thus, for example, other rigid, self-sustaining boards capable of withstanding impact, such as laminated asphalt stock and impregnated single sheet or filler board of the general class known as "backing" board, may be used in lieu of the preferred armor sheet described above, providing the same is creased or otherwise treated to form hinges or flexible joints so that the armor sheet may be made to conform to the contour of the pipe to be protected, preferably as closely as possible.

I claim:

1. In combination with a cylindrical pipe covered with a water-impermeable membrane to protect the pipe against corrosion, an armor encircling the membrane-covered pipe, said encircling armor comprising a self-sustaining, water-impermeable sheet capable of flexing along preformed hinge joints and resistant to falling rocks and the like, said sheet having a plurality of spaced, rigid flat portions and parallel flexible joint portions, each of said joint portions connecting a pair of said flat portions, each of the said flat portions being tangentially disposed with respect to the membrane-covered pipe and having only a limited central region thereof in contact with the membrane-covered pipe, whereby a space is formed between the armor and the pipe in the regions between the said limited regions of contact of the said flat rigid portions and the pipe, the arrangement of the said flat portions about the membrane-covered pipe being such that the encircling armor is in the form of a polygon.

2. In combination with a cylindrical pipe covered with a water-impermable membrane to protect the pipe against corrosion, an armor encircling the membrane-covered pipe, said encircling armor comprising a self-sustaining, water-impermeable sheet capable of flexing along preformed hinge joints and resistant to falling rocks and the like, said sheet having a plurality of spaced, rigid flat portions and parallel flexible joint portions, each of said joint portions connecting a pair of said flat portions, each of the said flat portions being tangentially disposed with respect to the membrane-covered pipe and having only a limited central region thereof in contact with the membrane-covered pipe, whereby a space is formed between the armor and the pipe in the regions between the said limited regions of contact of the said flat rigid portions and the pipe, there being more than four sides in the armor and the arrangement of the said flat portions about the membrane-covered pipe being such that the encircling armor is in the form of a polygon.

3. In combination with a cylindrical pipe covered with a water-impermeable membrane to protect the pipe against corrosion, an armor encircling the membrane-covered pipe, said encircling armor comprising a self-sustaining, water-impermeable sheet capable of flexing along preformed fold lines and resistant to falling rocks and the like, said sheet having a plurality of parallel, rigid, flat portions alternating with parallel fold lines pressed into said sheet from one side thereof so that said sheet may be folded in one direction only, said sheet being folded about the pipe with the side thereof in which the fold lines were pressed adjacent to said pipe, each of the said flat portions being tangentially disposed with respect to the membrane-covered pipe and having only a limited central region thereof in contact with the membrane-covered pipe, the arrangement of the said flat portions and fold lines about the membrane-covered pipe being such that the encircling armor is in the form of a polygon beneath each angle of which is a space within which the armor sheet may "give" under impact.

4. In combination with a cylindrical pipe covered with a water-impermeable membrane to protect the pipe against corrosion, an armor encircling the membrane-covered pipe, said encircling armor comprising a self-sustaining, water-impermeable sheet capable of flexing along preformed fold lines and resistant to falling rocks and the like, said sheet comprising a water-impermeable mastic core having asphalt-impregnated sheets adhered to the opposite sides thereof, said core comprising a homogeneous mixture of asphalt, inorganic filler material and fibrous material, and said sheet being divided into a plurality of parallel, rigid, flat portions by parallel fold lines pressed into said sheet from one side thereof so that said sheet may be folded in one direction only, said sheet being folded about the pipe with the side thereof in which the fold lines were pressed adjacent to said pipe, each of the said flat portions being tangentially disposed with respect to the membrane-covered pipe and having only a limited central region thereof in contact with the membrane-covered pipe, the arrangement of the said flat portions and fold lines about the membrane-covered pipe being such that the encircling armor is in the form of a polygon beneath each angle of which is a space within which the armor sheet may "give" under impact.

ROBERT E. PFLAUMER.

References Cited in the file of this patent

UNITED STATES PATENTS

| Number | Name | Date |
|---|---|---|
| 293,572 | Krahenbeihl et al. | Feb. 19, 1884 |
| 1,101,990 | Bird et al. | June 30, 1914 |
| 1,325,923 | Baum | Dec. 23, 1919 |
| 1,646,388 | Bullard | Oct. 25, 1927 |
| 2,082,175 | Sutherland | June 1, 1937 |
| 2,089,492 | Lambert | Aug. 10, 1937 |
| 2,297,413 | Jahn et al. | Sept. 29, 1942 |